Patented Feb. 28, 1933

1,899,224

UNITED STATES PATENT OFFICE

WILLIAM JOHN ABBOTT, OF TOORAK, VICTORIA, AUSTRALIA, ASSIGNOR TO INTERNATIONAL PRODUCTS PROPRIETARY LIMITED, OF MELBOURNE, VICTORIA, AUSTRALIA

MANUFACTURE OF DRIED FOOD PRODUCTS FROM RAW MEAT

No Drawing. Application filed July 24, 1929, Serial No. 380,769, and in Australia May 11, 1929.

This invention relates to the production of a dry food product obtained from raw meat and consisting chiefly of nutritive body building proteins and flavours and produced in a more perfect state of preservation with food properties more nearly resembling fresh meat, more easily available for nutrition in the alimentary system, and devoid of unattractive odours peculiar to dried meats, and in general a better commercial product.

As is well known raw meat contains 70 to 75 per cent of moisture, the bulk of which has to be removed to produce a dried product. Formerly methods of extracting the moisture had been accomplished by cooking the meat, or by immersing the heat in alcohol, or by subjecting the meat to long hours of artificial mechanical dehydration.

The object of this invention is to produce a dried meat product in a different manner than formerly, so that this product is made without cooking, or immersing meat in alcohol, or submitting meat to necessary long periods of artificial mechanical dehydration and low temperature heat. Other objects are, to ensure a process whereby ton quantities of raw meat can be treated without risk of deterioration or chemical changes to rancidity, and to ensure a uniform quality. Another object is to produce a dry product entirely free from unattractive odours and flavours.

It is well known that as soon as an animal is killed and the flow of blood ceases in the system, bacterial decomposition begins in the stagnant blood matters and water contained in the raw meat. These blood matters contain waste properties that were on the way to the elimination organs to form urine and urea. When meat is subject to low temperature heat it causes a rapid growth of bacteria which quickly spoils the meat. It is therefore necessary to remove the blood matters and water of the raw meat as quickly as possible, and this is one of the essential features of the invention. In treating large commercial quantities of meat, even a small portion undergoing a chemical change to rancidity may also spoil many times its quantity. Meat proteins and meat flavours are extremely sensitive, and are easily destroyed by adverse conditions.

According to the manufacture of the product now devised, raw meat is trimmed of fat and then cut or minced into fine particles and immersed in cold water of not less than 59° F., but the temperature may vary between 59° and 80° F., and any quantity of water may be used. The whole mass is then mechanically stirred, so that the added water may reach every particle. As the blood matters of the meat are soluble in water and of not less than this temperature the continuous agitation for a few minutes will separate the blood matters from the meat tissues. Surplus fat will rise to the surface which may be removed. This operation may be repeated as often as necessary until the meat tissues are cleansed from blood matters. The liquid is then strained off and the meat substance may then be mechanically pressed sufficiently to squeeze out remaining liquid which is drained off. The blood matters contained in the water so strained off will not be used in the manufacture of the product but may be used as by-products.

The meat substance is again placed in water and the whole stirred into a spongy mass and brought to a temperature of not less than 130° F., and though the temperature may vary between 130° and 150° F., a lower temperature will not give satisfactory results. Any known suitable mechanical method for heating and stirring the meat substance in the liquid may be applied. It is necessary to continue the stirring of the meat substance for a few minutes to distribute an even temperature throughout, after which it will be then found that the watery substance will come away freely, and the meat protein substance can be mechanically pressed into an almost dry cake. The immersion of the meat substance in the heated water and the operation of subsequently removing the liquid may be repeated as often as found necessary, though a single immersion will generally be found sufficient. This meat-protein substance can remain in the cake form or be broken up or granulated by any known mechanical method into fine particles. This granular meat protein product can be laid out in trays and exposed to the atmosphere under shelter for almost an indefinite period, and will remain sweet and clean in odour and will not deteriorate or undergo any change. It will be found that approximately ninety per cent of the original water content of the raw meat has been removed. The removal of this blood and water content by this process can be accomplished in about two hours and with it is the elimination of any possible danger of rancidity of the meat protein substance.

As is usual with all dried foods, before packing, the meat protein substance is exposed for the purpose of what is termed "conditioning" and in the course of a few hours the product has settled into a permanent condition. Low temperature heat may be used to hasten the conditioning, but there is no need to subject the meat protein substance to any further heat because it will condition naturally. This product may remain exposed to the atmosphere if necessary until ready for packing into containers.

The meat protein substance may be ground into powder or flour, and being devoid of blood matters its colour will be like ordinary wheat or oatmeal flour and will have the same keeping properties. Although this product will be practically flavourless it will contain more than 75% pure proteins, and is a valuable commercial food usable principally as an addition to other foods to increase their food values and body building and sustaining properties.

To produce a well flavoured appetizing commercial dried meat product it is first essential that the dried meat protein substance be practically devoid of odour and taste, and without the addition of chemical substances that may cause a foreign odour or flavour, or that may overflavour the delicate meat flavours that will be added. Also the cells of the meat protein substance must not be destroyed by any method that will cause them to become hard and gritty, but must remain of such absorptive nature so that they can immediately well absorb dense liquid flavours, thereby retaining them and protecting them from aeration. Also the meat must not be submitted to any process whereby blood matters are dried or coagulated into the meat protein substance. It has been found that when raw meat is heated substantially above 130° F., coagulation of blood matters into the meat protein substance begins. Dried blood matters must be carefully avoided.

The heated liquid expressed from the meat substance which is free of blood matters contains the fine delicate flavours of the meat and fats. This liquid is concentrated and reduced by any known method to a fine density and the fat removed. The fat removed will not be utilised in the manufacture of the product but may be used as a by-product. Extractive flavours obtained from the meat after it has been cleansed of blood matters also similar flavourings obtained from any other meat which has been subjected to this process, or from culinary vegetable or mineral substances, or any other preferred flavourings or any combination of such flavourings is then diffused over the meat protein substance in either cake or granular form. On the dried meat product absorbing the flavourings, the product is again conditioned as before described and can safely be exposed again for any period, if necessary, until ready for packing into containers. The clean wholesome condition of the meat proteins or meat substance will retain and preserve the delicate flavours without undergoing any chemical change although exposed for long periods.

The two forms of the product, one without flavourings and the other with flavourings are after conditioning ready for commercial use either in granular form or may be ground into powder or any finer condition, or may be pressed into cakes or tablets.

The products, particularly the flavoured product, may be used in lieu of ordinary meat for culinary and commercial use by adding a small quantity of water. The protein meat substance will at once absorb the added water and become immediately available as a meat food in various forms of cooking and food preparations.

The short period that the meat substance is subjected to low temperature heat ensures that the valuable proteins are not destroyed, and are not hardened or made gritty, and are conserved similar to their original condition, thereby ensuring greater solubility and availability of nutritives for digestion. The effect of the warm water on the internal fat content of the lean meat ensures the ready removal of said fat and also ensures a necessary uniform low fat content, thus avoiding a possible fat rancidity. The removal of the blood matters without the use of heat ensures that there are not blood matters to coagulate or dry into the meat protein substance when subjected to heat and moreover it also ensures that the proteins are clean and free from inedible blood matters and possible bacterial activity. The rapid removal of the blood matters and nearly the whole of the water content of the raw meat by this process, ensures that large quantities of meat can be treated safely without risk of deterioration. Moreover it ensures a uniform quality, attractive, wholesome, palatable product more suitable for human consumption.

I claim:—

1. A process of producing a dried food product from raw meat, which comprises finely mincing the meat, removing the blood from the capillaries thereof by stirring said finely minced meat in water having a temperature between 59° and 80° F., then separating the blood water from the meat protein substance, and finally immersing and agitating the blood freed meat protein substance in water having a temperature approximately between 130° and 150° F., to liberate the blood freed water content of the meat protein substance.

2. A process of producing a dried food product from raw meat, which comprises finely mincing the meat, removing the blood from the capillaries thereof by stirring said finely minced meat in water having a temperature between 59° and 80° F., then separating the blood water from the meat protein substance, then immersing and agitating the blood freed meat protein substance in water having a temperature between 130° and 150° F., to liberate the blood freed water content of the meat protein substance separating the said blood freed water content from the meat protein, concentrating the said blood freed meat flavoured water content and adding the same to the said meat protein.

WILLIAM JOHN ABBOTT.